US012755617B2

(12) United States Patent
Tatebe et al.

(10) Patent No.: US 12,755,617 B2
(45) Date of Patent: Oct. 6, 2026

(54) CLUTCH OPERATION DEVICE

(71) Applicant: SUBARU CORPORATION, Tokyo (JP)

(72) Inventors: Takanori Tatebe, Tokyo (JP); Naoto Yabuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/112,820

(22) PCT Filed: Feb. 24, 2023

(86) PCT No.: PCT/JP2023/006728
§ 371 (c)(1),
(2) Date: Mar. 18, 2025

(87) PCT Pub. No.: WO2024/176435
PCT Pub. Date: Aug. 29, 2024

(65) Prior Publication Data

US 2026/0087913 A1 Mar. 26, 2026

(51) Int. Cl.
*G08B 6/00* (2006.01)
*B60K 23/02* (2006.01)

(52) U.S. Cl.
CPC ................ *G08B 6/00* (2013.01); *B60K 23/02* (2013.01)

(58) Field of Classification Search
CPC ............ G08B 6/00; B60K 23/02; F16D 48/06
See application file for complete search history.

(56) References Cited

U.S. PATENT DOCUMENTS

| | | | | |
|---|---|---|---|---|
| 2009/0273458 | A1 | 11/2009 | Almqvist et al. | |
| 2018/0065480 | A1* | 3/2018 | Bradfield | B60K 23/02 |
| 2021/0332557 | A1* | 10/2021 | Tanigawa | B62D 33/0617 |
| 2022/0041063 | A1 | 2/2022 | Isami et al. | |

FOREIGN PATENT DOCUMENTS

| | | | |
|---|---|---|---|
| JP | S63-185731 | U1 | 11/1988 |
| JP | 2009-538252 | A | 11/2009 |
| JP | 2019-202591 | A | 11/2019 |
| JP | 2022-030814 | A | 2/2022 |

OTHER PUBLICATIONS

International Search Report received in PCT Application No. PCT/JP2023/006728, dated May 16, 2023.
Notice of Reasons for Refusal received in corresponding Japanese Patent Application No. 2025-502055, dated May 12, 2026.

* cited by examiner

*Primary Examiner* — Edwin A Young
(74) *Attorney, Agent, or Firm* — Rimon P.C.

(57) ABSTRACT

A clutch operation device includes: a clutch operator; a vibration applicator; a transition state detector; and a vibration application controller. The clutch operator is configured to switch between an engaged state and a disengaged state. In the engaged state, power transmission is performed between a traveling power source of a vehicle and wheels of the vehicle. In the disengaged state, the power transmission is cut off. The vibration applicator is configured to apply vibration to the clutch operator. The transition state detector is configured to perform detection of a transition state between the engaged state and the disengaged state. The vibration application controller is configured to activate the vibration applicator in accordance with the detection of the transition state.

8 Claims, 8 Drawing Sheets

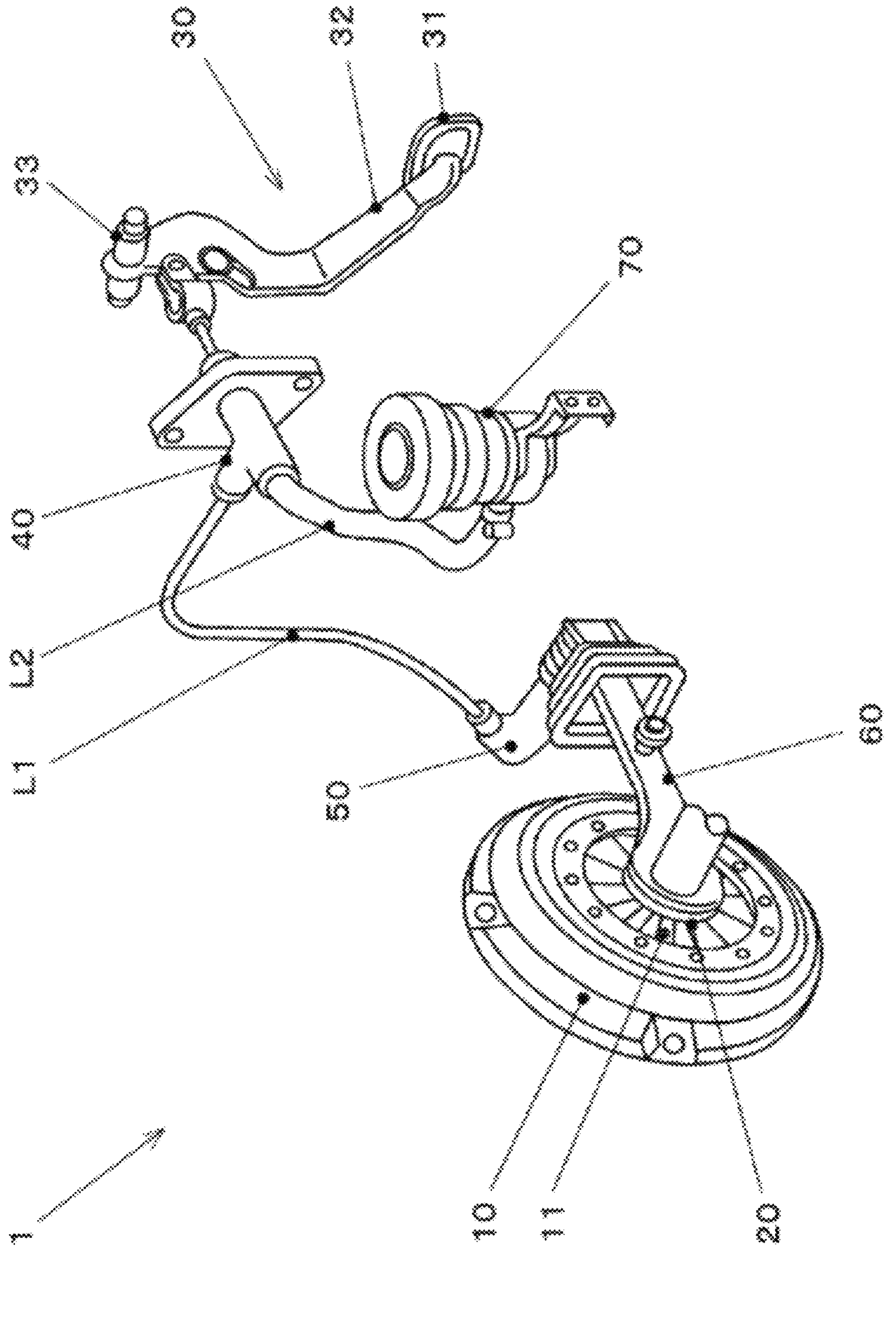
[FIG. 1]

[ FIG. 2 ]
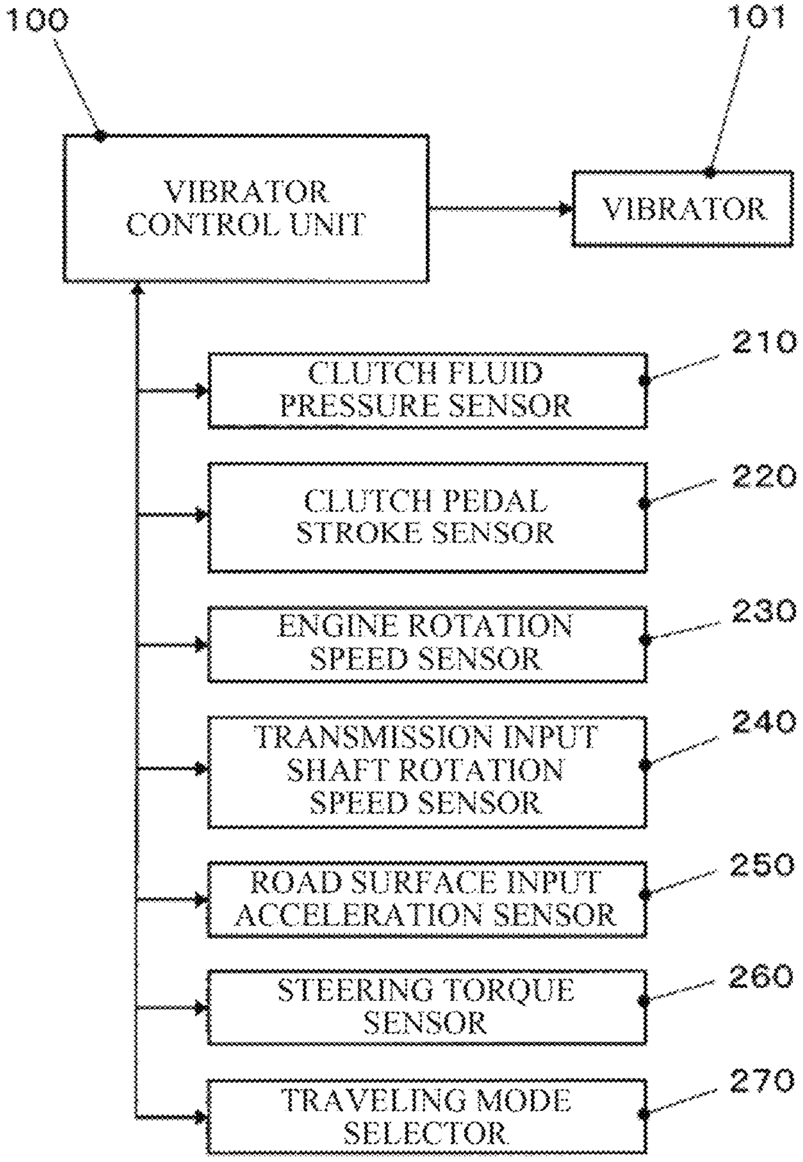

[FIG. 3]
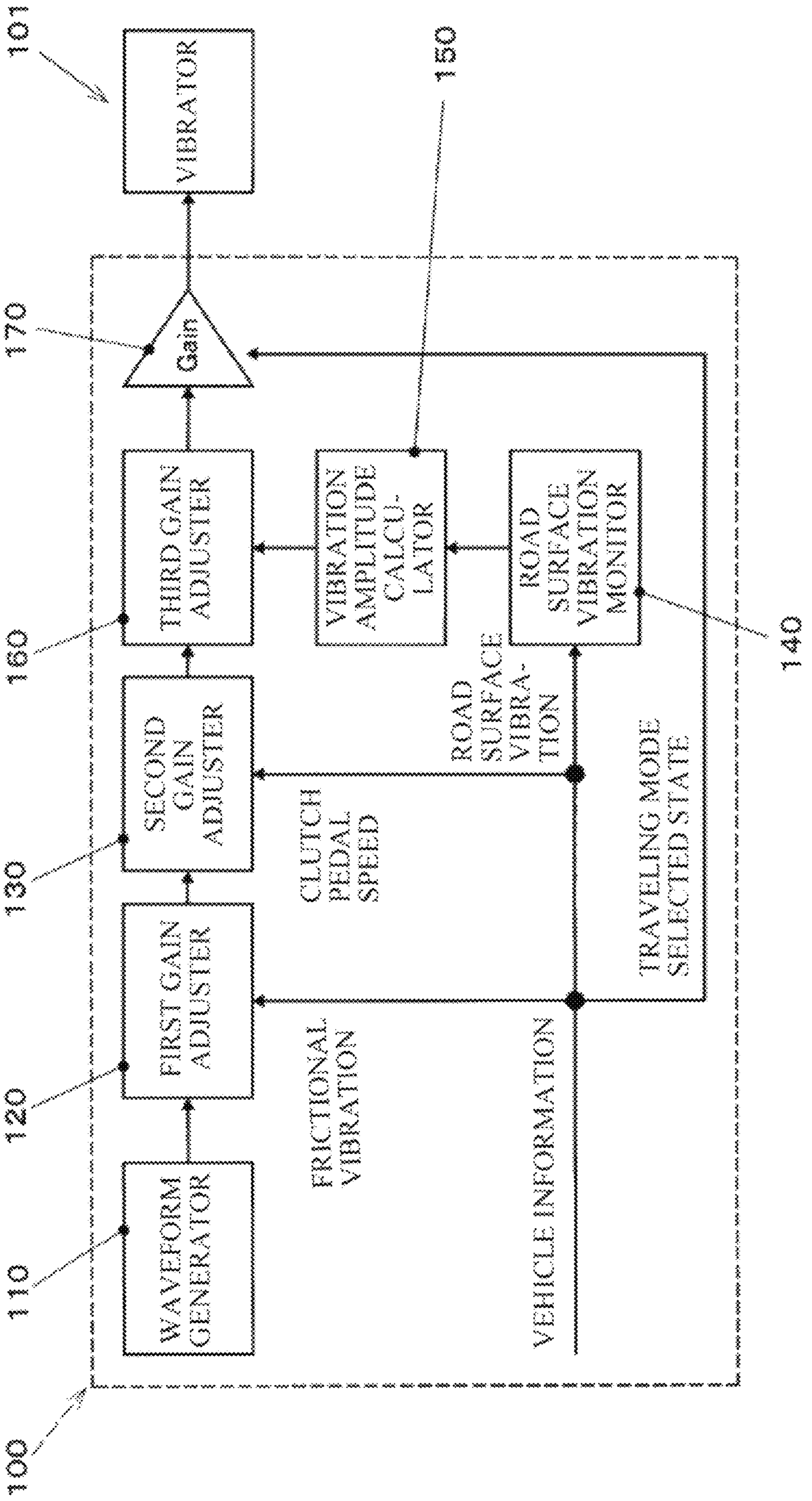

[ FIG. 4 ]
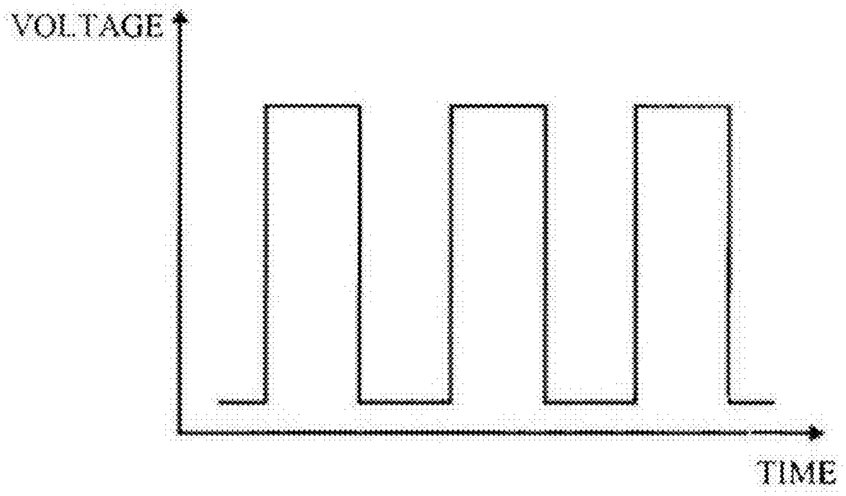
[FIG. 5]
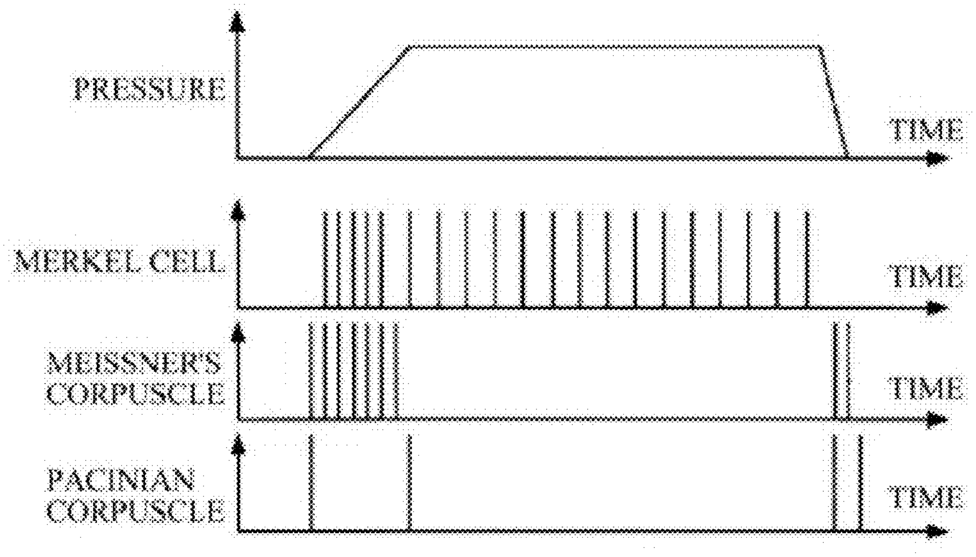

[ FIG. 6 ]
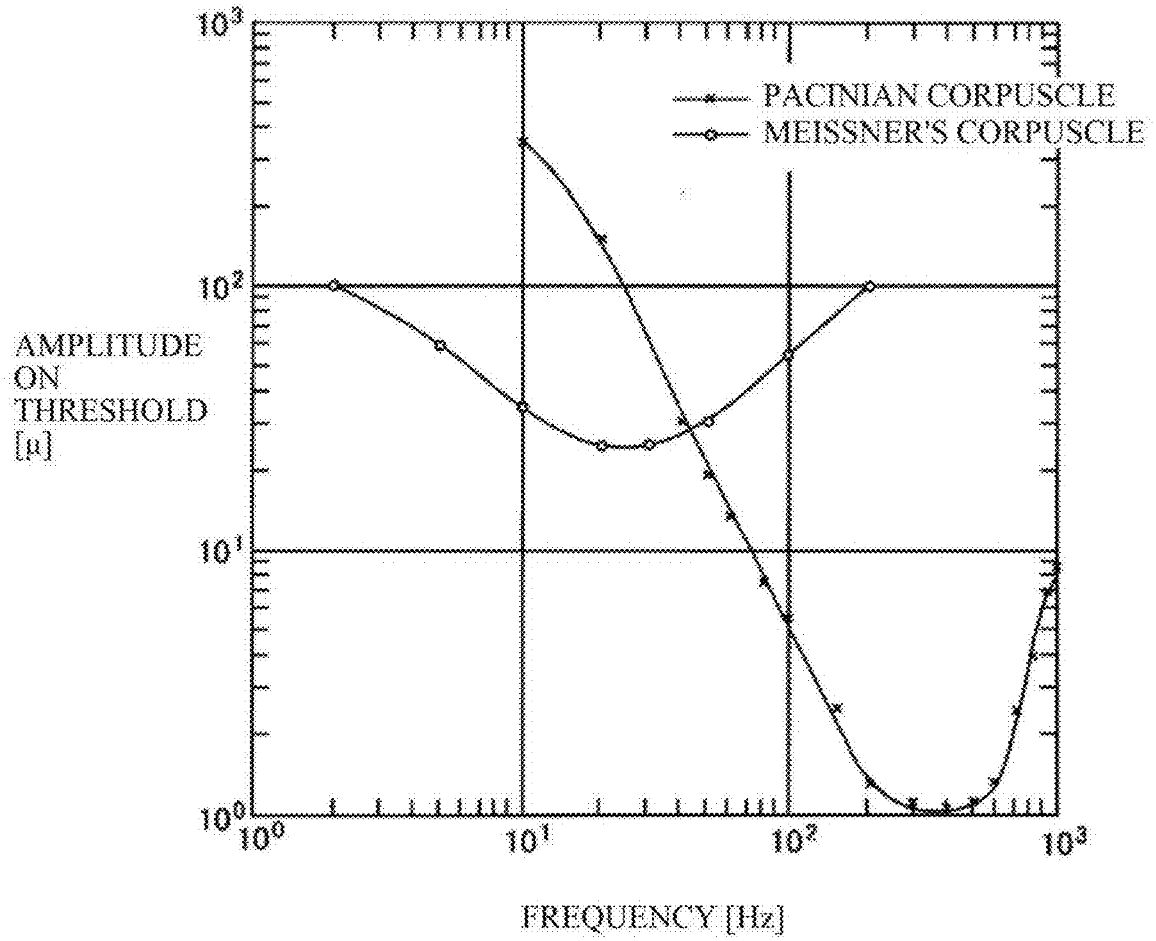
[ FIG. 7 ]
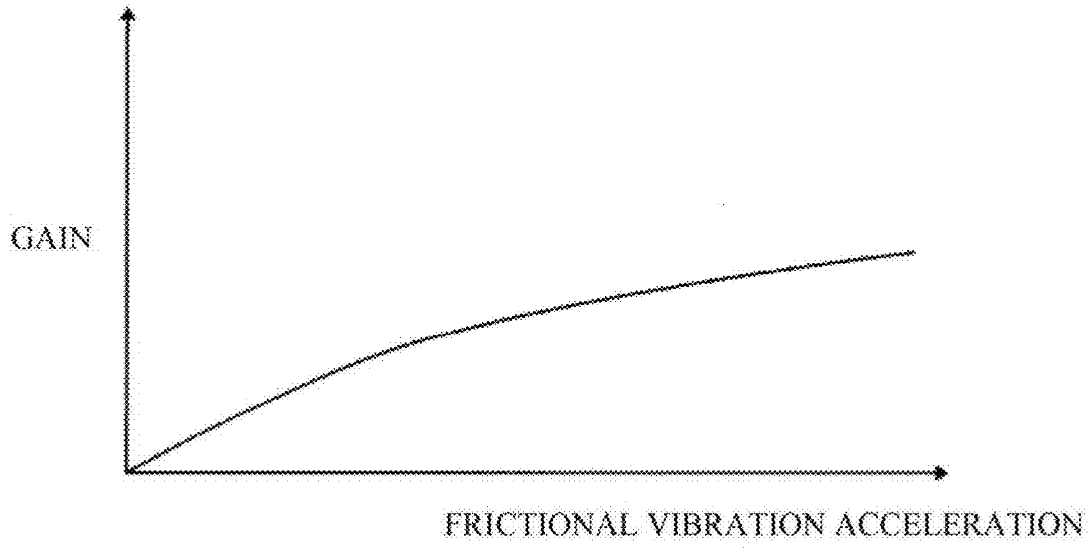

[FIG. 8]
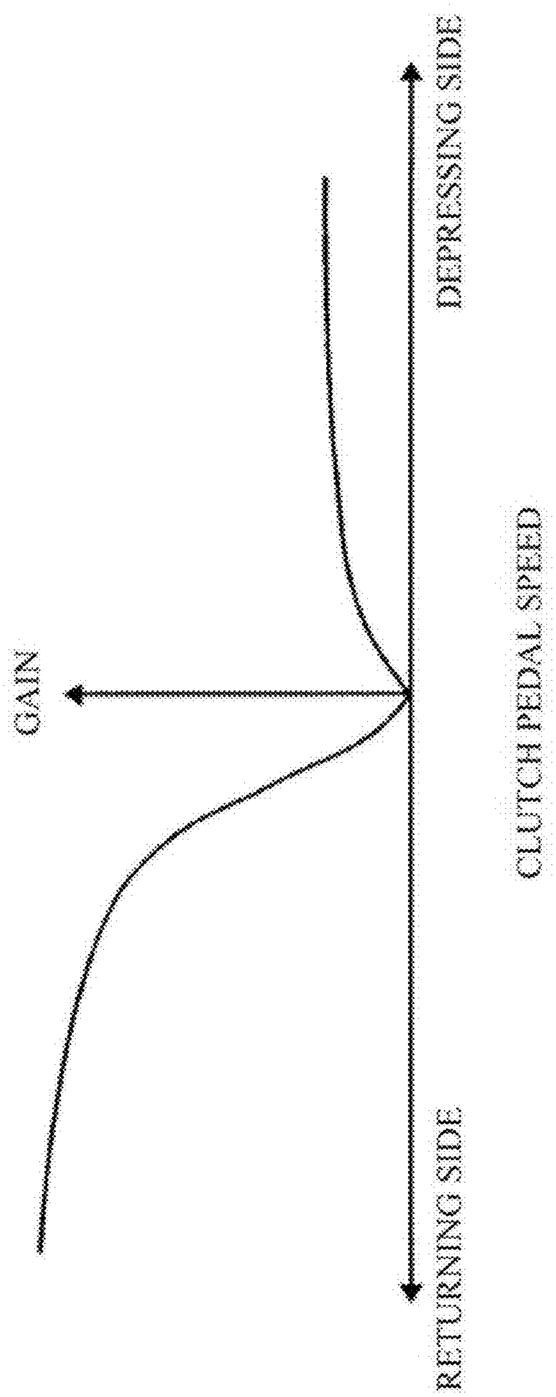

[ FIG. 9 ]
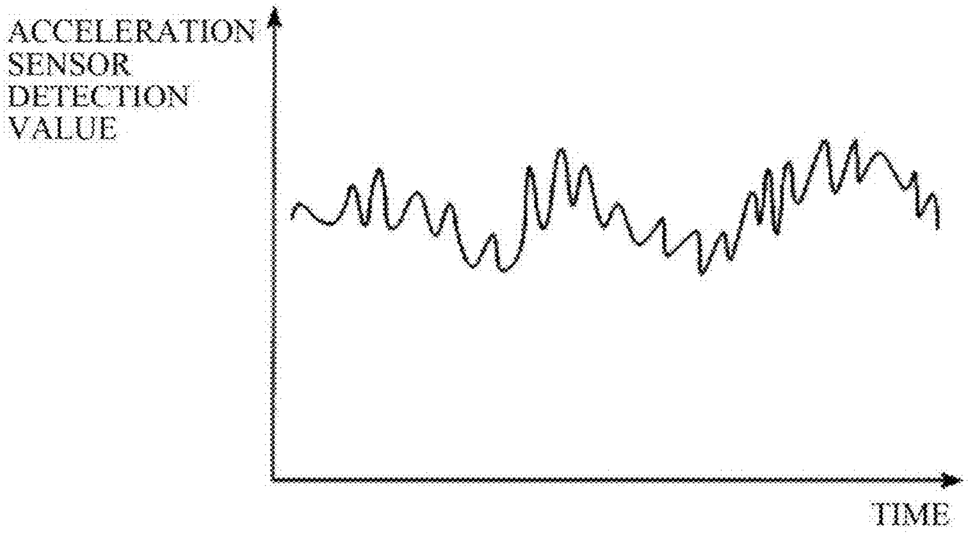
[ FIG. 10 ]
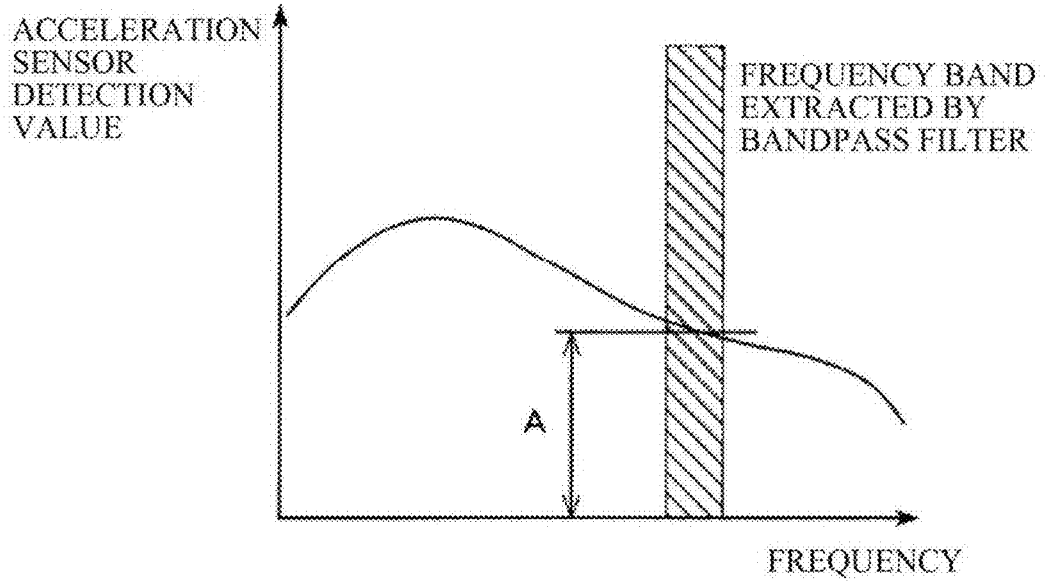

[ FIG. 11 ]
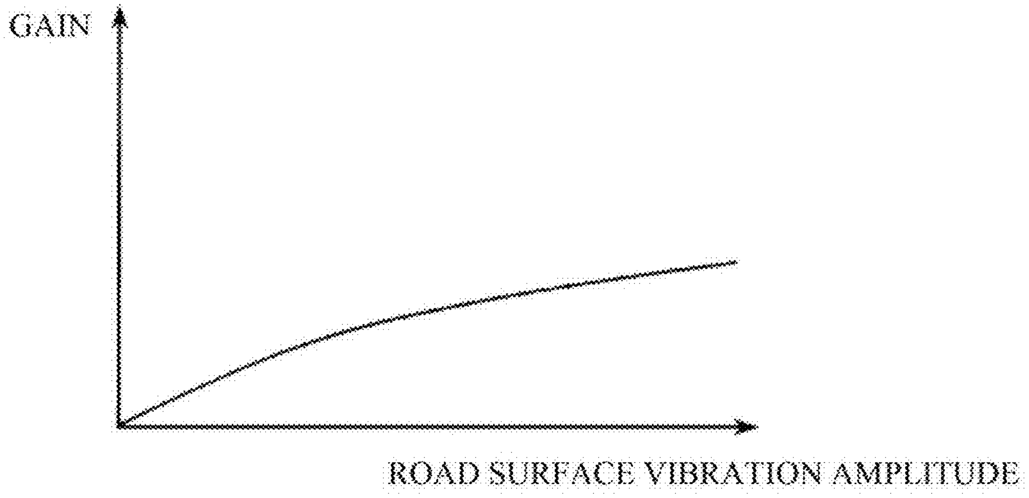
[ FIG. 12 ]
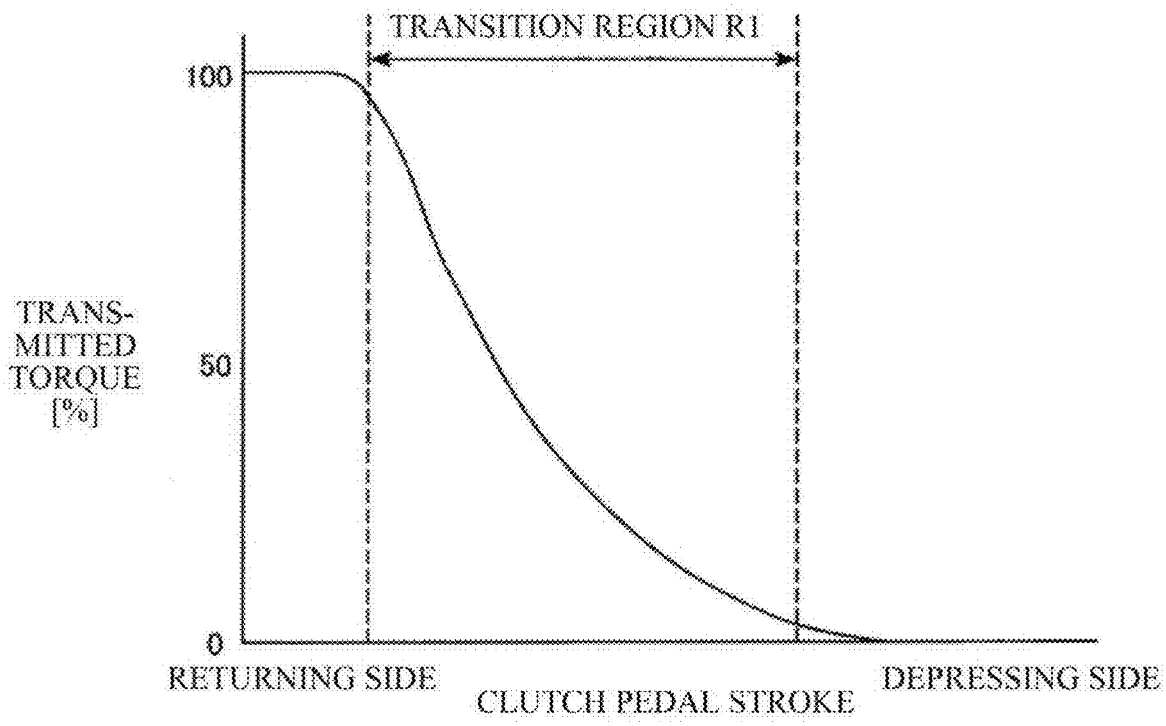

CLUTCH OPERATION DEVICE

CROSS-REFERENCE TO RELATED APPLICATIONS

This application is the U.S. National Phase under 35 U.S.C. § 371 of International Application No. PCT/JP2023/006728, filed on Feb. 24, 2023, the entire contents of each of which are hereby incorporated by reference.

TECHNICAL FIELD

The invention relates to a clutch operation device that performs a clutch operation of a power transmission device of a vehicle.

BACKGROUND ART

Patent Literature 1 describes, as a technique for giving a specific tactile feeling to a clutch operation of a driver who drives a vehicle, for example, an electronic vehicle including a controller and a pedal reaction force generator. The controller controls torque of an electric motor using an MT, i.e., manual transmission vehicle model based on an amount of an operation of an accelerator pedal, an amount of operation of a pseudo clutch pedal, and a shift position of a pseudo shifter. The pedal reaction force generator generates pedal reaction force against an operation of the pseudo clutch pedal through actuation of a reaction force actuator. In addition, the controller stores pedal reaction force characteristics simulating characteristics of pedal reaction force corresponding to an amount of an operation of a clutch pedal, and controls the pedal reaction force generator to output pedal reaction force corresponding to the amount of the operation of the pseudo clutch pedal in accordance with the stored pedal reaction force characteristics.

In addition, Patent Literature 2 describes a vibration waveform for exciting a Pacinian corpuscle or a Meissner's corpuscle as a vibration to be added to an operator of manual driving, in a vibration addition system corresponding to a relationship between driver consciousness and a response speed in the manual operation performed by the driver. In particular, Patent Literature 2 describes a frequency of 30 Hz to 250 Hz being suitable in terms of sensitivity characteristics.

CITATION LIST

Patent Literature

Patent Literature 1: Japanese Unexamined Patent Application Publication No. 2022-30814

Patent Literature 2: Japanese Unexamined Patent Application Publication (Translation of PCT Application) No. 2009-538252

SUMMARY OF INVENTION

Problem to be Solved by the Invention

A vehicle on which a driver of the vehicle performs a clutch operation has an advantage of making it possible to control transmission of driving force and a shift timing in accordance with a driver's intention.

For example, it is possible to immediately stop acceleration by disengaging a clutch upon a sudden start not intended by the driver. In addition, it is possible to utilize tire generation force as lateral force by cutting off driving force upon turning near a grip limit of the tire.

However, the operation of the clutch pedal depends on a feeling of the driver in many cases. In particular, upon starting, the driver is to return the clutch pedal while depressing an accelerator pedal, and is to transmit the driving force while finely adjusting a half clutch state.

The driver feels a change in a vibration conveyed from the clutch pedal peculiar to the half clutch state to make an adjustment. However, such a change in the vibration is very small, and, in many cases, the driver relies on individual accustomedness and on an individual memory (experience) of a clutch pedal position at the time of the half clutch.

In view of a problem described above, it is an object of the invention to provide a clutch operation device with improved operability of a clutch operation.

Means for Solving the Problem

To solve the above-described problem, an aspect of the invention provides a clutch operation device that includes: a clutch operator; a vibration applicator; a transition state detector; and a vibration application controller. The clutch operator is configured to switch between an engaged state and a disengaged state. In the engaged state, power transmission is performed between a traveling power source of a vehicle and wheels of the vehicle. In the disengaged state, the power transmission is cut off. The vibration applicator is configured to apply vibration to the clutch operator. The transition state detector is configured to perform detection of a transition state between the engaged state and the disengaged state. The vibration application controller is configured to activate the vibration applicator in accordance with the detection of the transition state.

Effects of the Invention

As described above, according to the invention, it is possible to provide the clutch operation device with improved operability of the clutch operation.

BRIEF DESCRIPTION OF THE DRAWINGS

FIG. 1 is a diagram illustrating a configuration of a clutch device having a first embodiment of a clutch operation device to which the invention is applied.

FIG. 2 is a block diagram illustrating a configuration of a vibration application control system in the clutch operation device according to the first embodiment.

FIG. 3 is a diagram schematically illustrating a configuration of a vibrator control unit according to the first embodiment.

FIG. 4 is a diagram schematically illustrating an example of a vibration application waveform according to the first embodiment.

FIG. 5 is a diagram schematically illustrating timings of electric pulses emitted by receptors at the time when a skin comes into contact with an object.

FIG. 6 is a diagram illustrating sensitivity distributions of a Pacinian corpuscle and a Meissner's corpuscle with respect to a frequency.

FIG. 7 is a diagram schematically illustrating an example of gain adjustment in a first gain adjuster.

FIG. 8 is a diagram schematically illustrating an example of gain adjustment in a second gain adjuster.

FIG. 9 is a diagram schematically illustrating an example of an output history of a road surface input acceleration sensor.

FIG. 10 is a diagram schematically illustrating a calculation method of vibration amplitude in a vibration amplitude calculator.

FIG. 11 is a diagram schematically illustrating an example of gain adjustment in a third gain adjuster.

FIG. 12 is a diagram schematically illustrating a stroke of a clutch pedal in a clutch operation device of a second embodiment and a degree of power reduction in an electric motor.

MODES FOR CARRYING OUT THE INVENTION

First Embodiment

Hereinafter, description is given of a first embodiment of a clutch operation device to which the invention is applied.

The clutch operation device of the first embodiment operates a clutch device provided in a vehicle such as an automobile including an engine, for example, as a traveling power source.

FIG. 1 is a diagram schematically illustrating a configuration of the clutch device provided with the clutch operation device according to the first embodiment.

The clutch device 1 is provided between the engine and a transmission that transmits an output of the engine to wheels.

The transmission is a power transmission device including a gearbox, a forward and reverse switching mechanism, for example.

The clutch device 1 switches between an engaging state and a disengaging state. In the engaging state, power transmission is possible between the engine and the transmission (between the engine and the wheels). In the disengaging state, the power transmission is cut off therebetween.

The clutch device 1 includes a clutch cover 10, a release bearing 20, a clutch pedal 30, a master cylinder 40, a release cylinder 50, a release fork 60, and a reserve tank 70, for example.

The clutch cover 10 is a member that houses a clutch disc splined to an input shaft of the transmission.

An outer circumferential edge of the clutch cover 10 is fastened to a flywheel of the engine.

The clutch cover 10 is provided, at a middle part, with a diaphragm spring 11 that generates crimping force to crimp the clutch disc to the flywheel.

The clutch disc serves as a first friction element of the invention. In addition, the flywheel and the clutch cover serve as a second friction element of the invention.

The release bearing 20 is provided to face a middle part of the diaphragm spring 11, and presses the middle part of the diaphragm spring 11 to a side of the engine along a rotational axis direction upon operation of release (disengagement) of the clutch.

The diaphragm spring 11 is configured to be pressed, at the middle part, against the release bearing 20 to thereby release the crimping force and disengage the clutch.

The clutch pedal 30 is a clutch operator on which an occupant (a driver) of a vehicle performs a clutch operation.

The clutch pedal 30 includes a depressing surface member 31, a bracket member 32, and a spindle 33, for example.

The depressing surface member 31 is an input member on which the occupant steps by a sole to thereby perform a clutch disengaging operation and from which the occupant returns the sole to thereby perform a clutch engaging operation.

The bracket 32 is a member formed to project upward from the depressing surface member 31 and supporting the depressing surface member 31 in a suspended state.

The spindle 33 is a rotational shaft provided at an upper end of the bracket 32 and rotatably (swingably) supporting the bracket 32.

In accordance with the depressing operation performed on the clutch pedal 30, the master cylinder 40 pressurizes and discharges a clutch fluid, which is a working fluid of the clutch device.

The master cylinder 40 is attached to a bulkhead, which is a dividing wall, provided at the front of a vehicle compartment, for example.

The release cylinder 50 presses one end of the release fork 60 using a plunger that is hydraulically driven by the clutch fluid supplied from the master cylinder 40 via a pipe L1.

The release fork 60 is an interlocking member that transmits motion of the plunger of the release cylinder 50 to the release bearing 20.

An end of the release fork 60 on a side opposite to a side of the release cylinder 50 is disposed to face an edge surface of the release bearing 20.

When the plunger of the release cylinder 50 presses the release fork 60, the release fork 60 swings about a fulcrum provided at an intermediate part to press the release bearing 20 in a direction in which the clutch is disengaged (a direction in which crimping force of the clutch cover 10 is released).

The reserve tank 70 is coupled to the master cylinder 40 via a pipe L2, and temporarily reserves an excess clutch fluid.

The clutch operation device of the first embodiment is characterized by applying vibration to the clutch pedal 30 using a vibrator 101 described below.

FIG. 2 is a diagram schematically illustrating a configuration of a vibrator control system in the clutch operation device according to the first embodiment.

The vibrator control unit 100 is a vibration application controller that supplies the vibrator 101 with a drive current having a predetermined vibration application waveform and a drive voltage having a predetermined vibration application waveform.

Detailed description is given later of a configuration of the vibrator control unit 100.

In addition, the vibrator control unit 100 serves as a transition state detector of the invention that detects a transition state (a half clutch state) of the clutch device 1.

The vibrator 101 is a vibration applicator that directly or indirectly applies vibration to, for example, the depressing surface member 31 of the clutch pedal 30.

The vibrator 101 may be configured to include, for example, a diaphragm and a voice coil generating vibration corresponding to a variation in the supplied voltage.

For example, a small speaker is usable as the vibrator 101.

The vibrator 101 is attached to a location through which vibration is transmittable to the depressing surface member 31, for example, by solid propagation, such as the master cylinder 40 or the bracket 32 of the clutch pedal 30, for example.

Vibration generated by the vibrator 101 is transmitted to a foot of the driver via the depressing surface member 31.

In addition, it is also possible to use a space (air in the vehicle compartment) as a transmission path of the vibration. For example, it is also possible to propagate the vibration from a speaker through the air for transmission of the vibration to skin sensation of the driver.

To the vibrator control unit 100, are coupled directly or via an in-vehicle LAN such as a CAN communication system, for example, a clutch fluid pressure sensor 210, a clutch pedal stroke sensor 220, an engine rotation speed sensor 230, a transmission input shaft rotation speed sensor 240, a road surface input acceleration sensor 250, a steering torque sensor 260, and a traveling mode selector 270.

The clutch fluid pressure sensor 210 is a pressure sensor provided in the master cylinder 40 and detecting a hydraulic pressure of the clutch fluid generated by the master cylinder 40.

The clutch pedal stroke sensor 220 is a sensor that detects a stroke (depression amount) of the depressing surface member 31 of the clutch pedal 30.

The clutch pedal stroke sensor 220 includes, for example, an encoder that detects a rotational angle position of the bracket 32 around the spindle 33.

It is possible to calculate a stroke (a position of the depressing surface member 31) of the clutch pedal 30 based on outputs of the clutch fluid pressure sensor 210 and the clutch pedal stroke sensor 220. Time differentiation of the calculated stroke makes it possible to detect an operation speed of the clutch pedal 30.

The clutch fluid pressure sensor 210 and the clutch pedal stroke sensor 220 cooperate with the vibrator control unit 100 to serve as an operation speed detector of the invention.

The engine rotation speed sensor 230 is a sensor that detects a rotational speed (engine rotation number) of an engine output shaft (crankshaft) provided on one side (driving side) of the clutch device 1.

It is possible to use, as an engine rotation angle sensor 230, a crank angle sensor that generates an output corresponding to a rotational angle position of the crankshaft and is used, for example, for controlling of the engine.

The transmission input shaft rotation speed sensor 240 is a sensor that detects a rotational speed (rotation number) of an input shaft (main drive shaft) of the transmission provided on the other side (driven side) of the clutch device 1.

The road surface input acceleration sensor 250 is a sensor that detects acceleration of vibration inputted to the vehicle from a road surface upon traveling of the vehicle.

It is possible to use, as the road surface input acceleration sensor 250, an acceleration sensor that detects acceleration in a vertical direction and is provided, for example, in components on an unsprung side of a suspension device, such as a hub bearing housing or a suspension arm.

The steering torque sensor 260 is a sensor that is provided in an electric power steering device and detects torque acting on a steering shaft. The electric power steering device allows for steering of front wheels, which are wheels of the vehicle to be steered. The steering shaft couples a steering wheel and a steering gearbox to each other.

An output of such a steering torque sensor 260 may also be used instead of or in combination with an output of the road surface input acceleration sensor 250, because the output of the steering torque sensor 260 includes a vibration input from the road surface.

The traveling mode selector 270 causes the driver to select, as a traveling mode of the vehicle, any one of a plurality of traveling modes set in advance.

The traveling mode may be configured to have, for example, a normal mode suitable for general driving and a sports mode suitable for driving in a circuit, for example.

The vehicle may be configured to change, for example, characteristics such as engine characteristics, gear change characteristics of the transmission, or damping force characteristics of the suspension device, depending on the selected traveling mode.

FIG. 3 is a diagram schematically illustrating a configuration of the vibrator control unit according to the first embodiment.

The vibrator control unit 100 includes, for example, a waveform generator 110, a first gain adjuster 120, a second gain adjuster 130, a road surface vibration monitor 140, a vibration amplitude calculator 150, a third gain adjuster 160, and a gain selector 170.

The waveform generator 110 generates a fundamental wave (a wave that has not yet been subjected to adjustment such as gain adjustment) of a vibration application waveform which is a voltage waveform of a driving electric power of the vibrator 101.

FIG. 4 is a diagram schematically illustrating an example of a vibration application waveform according to the first embodiment.

In FIG. 4, the horizontal axis indicates time, and the vertical axis indicates a voltage.

As illustrated in FIG. 4, the vibration application waveform may be a rectangular wave, for example, but is not limited thereto; the vibration application waveform may be another waveform.

In the first embodiment, as for the frequency, the vibration application waveform may have a dominant frequency in a range from 100 Hz to 400 Hz, for example.

Note that, as used herein, the dominant frequency refers to a frequency having particularly large amplitude as compared with amplitude of another frequency. In general, such a dominant frequency, in many cases, coincides with a frequency having a particularly large amplitude among a plurality of characteristic values (characteristic vibration numbers).

Hereinafter, description is given of the reason therefor.

Examples of a sensory receptor (tactile sensor) by which a foot of the driver in contact with the depressing surface member 31 acquires tactile sensation (skin sensation) include a Merkel cell, a Meissner's corpuscle, and a Pacinian corpuscle.

FIG. 5 is a diagram schematically illustrating timings of electric pulses emitted by the receptors at the time when the skin comes into contact with an object.

In FIG. 5, the horizontal axis indicates time, and the vertical axis indicates, in order from the top, a pressure, and electric pulse generation states of the Merkel cell, the Meissner's corpuscle, and the Pacinian corpuscle.

The Merkel cell has a relatively slow response, and responds to a direct current component.

The Meissner's corpuscle responds when a rate of change (speed) in a contact pressure occurs.

The Meissner's corpuscle reacts whenever there is a speed. Accordingly, if a vibration application waveform having a frequency to which the Meissner's corpuscle is highly sensitive is used, it is considered that the driver easily feels the frequency as vibration.

The Pacinian corpuscle responds to a moment of a transient change, and is considered to have the highest sensitivity of these receptors.

The Pacinian corpuscle is considered to be dominant as a receptor by which the driver senses reaction force of a very small operation.

FIG. 6 is a diagram illustrating sensitivity distributions of the Pacinian corpuscle and the Meissner's corpuscle with respect to a frequency.

In FIG. 6, the horizontal axis indicates a frequency, and the vertical axis indicates amplitude on a threshold; a smaller value represents better sensitivity.

As illustrated in FIG. 6, the Pacinian corpuscle exhibits favorable sensitivity in a region around 100 Hz to 400 Hz. Accordingly, in the embodiment, a vibration application waveform having a dominant frequency within a frequency band in a range from 100 Hz to 400 Hz is used.

In addition, it is also possible to obtain an effect of stimulating the Meissner's corpuscle by further adding a component of a frequency band in a range from 10 Hz to 50 Hz to the vibration application waveform.

The first gain adjuster 120 performs first gain adjustment described below on the vibration application waveform.

The first gain adjustment is directed to increasing the gain of the vibration application waveform (increasing the amplitude of the vibration application waveform) when the clutch device is in a transition state between an engaged state and a disengaged state (a half clutch state where the clutch disc and the flywheel as well as the clutch cover are slipping from each other).

The first gain adjustment may be configured to increase the gain of the vibration application waveform in accordance with an increase in frictional vibration generated as a result of the half clutch state, for example.

FIG. 7 is a diagram schematically illustrating an example of the gain adjustment in the first gain adjuster.

In FIG. 7, the horizontal axis indicates acceleration of the frictional vibration, and the vertical axis indicates a gain multiplied by an added waveform.

The frictional vibration is caused by a slip-stick phenomenon in which, for example, a slip ratio between the clutch disc and the flywheel as well as the clutch cover varies cyclically.

It is possible to detect the frictional vibration based on, for example, an output of the clutch fluid pressure sensor 210 provided in the master cylinder 40.

The frictional vibration of the clutch device 1 is propagated to the master cylinder via the pipe L1 and the clutch fluid therein.

In addition, the frictional vibration may be detected using an acceleration sensor provided in a clutch housing or the pipe L1, for example.

In addition, the frictional vibration of the clutch disc may be estimated based on outputs of the engine rotation speed sensor 230 and the transmission input shaft rotation speed sensor 240. For example, when the output shaft rotational speed of the engine and the input shaft rotational speed of the transmission do not coincide with each other and the stroke of the clutch pedal 30 is not at a position corresponding to a disengaged state, a configuration may be adopted in which the frictional vibration is estimated to be increased on the assumption that the stroke of the clutch pedal 30 is in a half clutch state.

The second gain adjuster 130 performs second gain adjustment further described below on the vibration application waveform after the first gain adjustment.

The second gain adjustment is directed to performing gain adjustment in accordance with an operation speed of the clutch pedal 30.

The operation speed of the clutch pedal 30 (an angular speed at which the depressing surface member 31 rotates) is able to be determined by time differentiation of an operation amount (depression amount) of the clutch pedal 30 detected by the clutch fluid pressure sensor 210 or the clutch pedal stroke sensor 220.

FIG. 8 is a diagram schematically illustrating an example of gain adjustment in the second gain adjuster.

In FIG. 8, the horizontal axis indicates a pedal operation speed (e.g., an angular speed of the depressing surface member 31), and the vertical axis indicates a gain to be added to the gain after the first gain adjustment.

The gain may be configured to increase in accordance with an increase in the pedal operation speed (absolute value), for example.

Here, an increase rate of the gain with respect to the pedal operation speed is set to be larger, in a region where the operation speed of the pedal is low, than in a region where the operation speed is high. The increase rate of the gain with respect to the pedal operation speed is set to gradually decrease in accordance with an increase in the pedal operation speed.

In addition, when the absolute values of the pedal operation speed are equivalent, the gain on a returning side (engaging operation side) is set to be larger than the gain on a depressing side (releasing/disengaging operation side).

The second gain adjuster 130 may be configured to increase the gain in accordance with an increase in the operation amount (depression amount) of the clutch pedal 30, instead of or together with the pedal operation speed.

In this case, performing gain adjustment in accordance with the operation amount of the clutch pedal 30 makes it possible to achieve an effect as a spring/rigidity term.

The road surface vibration monitor 140 serves to monitor the output of the road surface input acceleration sensor 250 and to hold a history over a predetermined period of time.

FIG. 9 is a diagram schematically illustrating an example of an output history of the road surface input acceleration sensor.

In FIG. 9, the horizontal axis indicates time, and the vertical axis indicates a detection value (unsprung vertical acceleration) of the road surface input acceleration sensor 250.

Data on the output history of the road surface input acceleration sensor 250 is provided to the vibration amplitude calculator 150.

The vibration amplitude calculator 150 applies bandpass filter processing to the output of the road surface input acceleration sensor 250 provided by the road surface vibration monitor 140 to extract a component of a specific frequency region, and calculates a vibration amplitude of the frequency region.

FIG. 10 is a diagram schematically illustrating a calculation method of the vibration amplitude in the vibration amplitude calculator.

In FIG. 10, the horizontal axis indicates a frequency, and the vertical axis indicates a detection value of the road surface input acceleration sensor 250.

The bandpass filter may be configured, for example, to extract some of frequency bands (e.g., near 250 Hz) included in the band in a range from 100 Hz to 400 Hz.

A vibration amplitude A in the extracted frequency bands (e.g., an average value of the frequency bands) is provided to the third gain adjuster 160.

The third gain adjuster 160 performs third gain adjustment further described below on the vibration application waveform after the second gain adjustment.

The third gain adjuster 160 performs the third gain adjustment based on outputs of the road surface vibration monitor 140 and the vibration amplitude calculator 150.

FIG. 11 is a diagram schematically illustrating an example of gain adjustment in the third gain adjuster.

In FIG. 11, the horizontal axis indicates torque amplitude calculated by the vibration amplitude calculator 150, and the vertical axis indicates a gain to be added to the gain after the adjustments of the first and second gain adjustments.

As illustrated in FIG. 11, the third gain adjuster 160 increases a gain (increases the amplitude of the vibration application waveform) in accordance with an increase in vibration amplitude from a road surface.

In the third gain adjuster 160, when the vibration application amplitude added from the vibrator 101 is defined as $\Delta A$ and the vibration amplitude from the road surface obtained from the vibration amplitude calculator 150 is defined as A, $\Delta A/A$ is considered to be a Weber fraction W.

Thus, it is considered that performing gain adjustment to allow the Weber fraction W to be a predetermined value set in advance enables achievement of stable effects from a Weber-Fechner law.

The gain selector 170 generates vibration application waveforms corresponding to a plurality of gain values having different magnitudes in stages, based on gains having been subjected to the gain adjustments by the first gain adjuster 120, the second gain adjuster 130, and the third gain adjuster 160. The gain selector 170 also selects one vibration application waveform from the vibration application waveforms having been subjected to the amplitude adjustment performed by the plurality of gain values in accordance with a traveling mode selected by the traveling mode selector 270.

When the sports mode is selected as a traveling mode, for example, the gain selector 170 may be configured to select a larger gain than that of the normal mode (to increase the amplitude of the vibration application waveform) in order to further improve the operability of the clutch pedal 30.

According to the first embodiment described above, it is possible to obtain the following effects.

(1) When the clutch device 1 is in a transition state (a half clutch state) between an engaged state and a disengaged state, applying vibration to the clutch pedal 30 stimulates receptors responsible for the skin sensation of the sole by which the driver performs a clutch operation and makes it easier for the driver to recognize a state of the clutch operation, thus making it possible to improve the operability of the clutch operation.

This makes it possible to improve drivability of the vehicle and smoothness of traveling.

(2) The vibrator 101 applies vibration to the clutch pedal 30 with a vibration application waveform including a frequency component in a range from 100 Hz to 400 Hz to thereby apply vibration to the clutch pedal 30 in a frequency band with favorable sensitivity of a Pacinian corpuscle, which is a receptor responsible for skin sensation and is considered to have the fastest response in the skin sensation, thus making it easier for the driver to feel a change in pressure received from the sole, for example.

This enables the driver to have improved spatial resolving power that allows for perception of an amount of operation of the clutch device, thus making it possible to perform a more accurate clutch operation.

(3) The clutch pedal 30 switches between a crimped state and a separated state of the flywheel as well as the clutch cover and the clutch disc, which are provided between the engine and the wheels, thereby switching between an engaged state and a disengaged state. The vibrator control unit 100 detects a transition state based on a slip state (a state of frictional vibration) of these elements, thereby making it possible to appropriately obtain the above-described effects.

(4) Increasing the amplitude of the vibration application waveform in accordance with an increase in the operation speed (absolute value) of the clutch pedal 30 makes it possible to effectively improve sensitiveness of the driver for reaction force upon performing operations of disengaging and engaging the clutch. In particular, when the operation speed is fast, increasing the vibration application amplitude to emphasize a sense of reaction force (sense of pressure) allows the driver to feel a change corresponding to the operation speed, thus enabling an action as a damping term.

(5) Increasing the amplitude of the vibration application waveform of the vibrator 101 in accordance with the increase in the amplitude of a vibration input from the road surface makes it possible to secure the above-described effects, even when vibration transmitted from the road surface increases due to, for example, a rough road surface or a rough tire pattern shape, by increasing the amplitude of the vibration application waveform.

Second Embodiment

Next, description is given of a second embodiment of the clutch operation device to which the invention is applied.

In the second embodiment, components similar to those of the foregoing first embodiment are denoted by the same reference numerals, and descriptions thereof are omitted; description is given mainly of differences.

In the second embodiment, the vehicle is, for example, an electric vehicle including an electric motor as a traveling power source.

No physical clutch device as in the first embodiment is provided between the electric motor and a power transmission mechanism.

In the second embodiment, output torque of the electric motor is lowered in accordance with a depressing operation performed on the clutch pedal 30 to thereby generate, in a pseudo manner, effects similar to those of the case where the clutch is disengaged in the engine vehicle as in the first embodiment.

FIG. 12 is a diagram schematically illustrating a stroke of the clutch pedal in the clutch operation device of the second embodiment and a degree of power reduction in the electric motor.

In FIG. 12, the horizontal axis indicates the stroke of the clutch pedal, and the vertical axis indicates output torque (%) of the electric motor with respect to a clutch engaged state (a state in which the stroke of the clutch pedal is zero).

In the second embodiment, a configuration may be adopted in which a region R1, where a rate of a change in the output torque with respect to the stroke of the clutch pedal is a predetermined rate or more, is recognized as a transition region (a region corresponding to the half clutch of the physical clutch), thus improving an output gain of the vibration application waveform.

According to the second embodiment as described above, it is possible, even in the electric vehicle including no physical clutch device, to improve the operability of the clutch operation in the transition region in the same manner as the foregoing first embodiment.

MODIFICATION EXAMPLES

The invention is not limited to the embodiments described above, and various modifications or changes may be made, which are also within the technical scope of the invention.

(1) The respective configurations of the clutch operation device, the clutch device, and the vehicle are not limited to those of the foregoing embodiments, and may be modified as appropriate.

(2) According to the embodiments, the clutch operation device performs the clutch operation using a foot pedal. However, the invention is not limited thereto, and is also applicable to a clutch operation device having another operation mode.

The invention is also applicable to a lever clutch operation device that is provided on a handlebar of a motorcycle, for example, and that is to be operated by fingers of the driver.

(3) According to the embodiments, a gain of the vibration application amplitude is increased in order to further improve the operability of the clutch operation device when the sports mode is selected, but this is not limitative. When another traveling mode is selected, the gain of the vibration application amplitude may be increased as compared with that of the normal time.

For example, when a traveling mode (e.g., an icy and snowy road mode) corresponding to traveling on a road surface with a low friction coefficient is selected, on which a slip easily occurs upon starting and the clutch operation becomes severe, the gain of the vibration application amplitude may be increased.

(4) According to the embodiments, the vibration from the road surface is detected based on acceleration of the unsprung part of the suspension device. However, a method of detecting the vibration from the road surface is not limited thereto, and may be modified as appropriate.

For example, a vibration pickup may be provided at a brake fluid pipe (a brake line) that is coupled to a wheel cylinder provided at the unsprung part.

Alternatively, the vibration from the road surface may be detected based on an output of the steering torque sensor of a power steering device or an output of a vibration sensor or a rack thrust sensor provided on a steering rack.

(5) According to the embodiments, the rectangular wave is used as an example of the vibration application waveform, but this is not limitative. For example, the vibration application waveform of any other waveform such as a sine wave, a triangular wave, or a random wave may be used. In addition, a method of adjusting a gain is not limited to the configurations of the embodiments, and may be modified as appropriate.

(6) The specific configuration of the vibrator (vibration applicator), the principles of the vibration application, and the location to be provided therewith, for example, are not limited to those described in the embodiments, and may be modified as appropriate.

For example, no limitation is made to the configuration using a speaker (voice coil) as in the embodiments, and, for example, a motor or a solenoid may be used to apply vibration to the clutch operator.

An aspect of the invention provides a clutch operation device that includes: a clutch operator; a vibration applicator; a transition state detector; and a vibration application controller. The clutch operator is configured to switch between an engaged state and a disengaged state. In the engaged state, power transmission is performed between a traveling power source of a vehicle and wheels of the vehicle. In the disengaged state, the power transmission is cut off. The vibration applicator is configured to apply vibration to the clutch operator. The transition state detector is configured to perform detection of a transition state between the engaged state and the disengaged state. The vibration application controller is configured to activate the vibration applicator in accordance with the detection of the transition state.

Accordingly, when the clutch device is in the transition state between an engaged state and a disengaged state, applying vibration to the clutch operator stimulates receptors responsible for skin sensation of a sole or fingers by which a driver performs a clutch operation to make it easier for the driver to recognize a state of the clutch operation, thereby making it possible to improve operability of the clutch operation.

It is therefore possible to improve drivability of a vehicle as well as smoothness of the traveling.

Note that, in the specification and claims, the clutch device is not limited to the one actually including a friction engagement element such as a clutch disc; the clutch device means a device that adjusts transmission and cutting of power. Here, when there is, for example, a driving force adjustment pedal (a pseudo clutch operator) such as a pseudo clutch provided in an electric vehicle, for example, an operation of such a pseudo clutch operator is regarded as a clutch operation. Applying vibration to the clutch operator and adjusting amplitude of a vibration application waveform in accordance with a transition state detected from a stroke value of the clutch operator and an amount of transmitted power make it possible to obtain effects similar to those in the case of the clutch device including the friction engagement element.

According to the invention, the vibration applicator may be configured to apply vibration to the clutch operator with a vibration application waveform including a frequency component in a range from 100 Hz to 400 Hz.

Accordingly, applying vibration to the clutch operator in a frequency band with favorable sensitivity of a Pacinian corpuscle, which is a receptor responsible for skin sensation and is considered to have the fastest response in the skin sensation, makes it easier for the driver to feel a change in pressure received from the sole of a foot, for example.

This enables the driver to have improved spatial resolving power that allows for perception of an amount of operation of the clutch device, thus making it possible to perform more accurate clutch operation.

According to the invention, the clutch operator may be configured to switch between the engaged state and the disengaged state by switching between a crimped state and a separated state of a first friction element and a second friction element that are provided between the traveling power source and the wheels, and the transition state detector may be configured to perform detection of the transition state based on a slip state between the first friction element and the second friction element.

This allows for appropriate detection of the transition state, thus making it possible to appropriately obtain the above-described effects.

Here, it is possible to detect the slip state, for example, based on frictional vibration generated at the time when each friction element slips.

In addition, it is also possible to detect the slip state based on a relative speed between the first friction element and the second friction element.

For example, it is possible to detect the slip state based on an output shaft rotational speed of an engine coupled via the clutch device and an input shaft rotational speed of a transmission.

According to the invention, the clutch operation device may further include an operation speed detector configured to perform detection of an operation speed of the clutch operator, and the vibration application controller may be configured to increase amplitude of the vibration application waveform in accordance with an increase in the operation speed.

Accordingly, increasing the amplitude of the vibration application waveform in accordance with the increase in the operation speed of the clutch operator makes it possible to effectively improve sensitiveness of the driver for reaction force upon performing operations of disengaging and engaging the clutch. In particular, when the operation speed is fast, increasing the vibration application amplitude to emphasize a sense of reaction force (sense of pressure) allows the driver to feel a change corresponding to the operation speed, thus enabling an action as a damping term.

According to the invention, the clutch operation device further includes a vibration input detector configured to perform detection of a vibration input from a road surface, and the vibration application controller is configured to increase amplitude of the vibration application waveform of the vibration applicator in accordance with an increase in amplitude of the vibration input.

Accordingly, even when vibration transmitted from a road surface increases due to, for example, a rough road surface or a rough tire pattern shape, increasing the amplitude of the vibration application waveform makes it possible to secure the above-described effects.

Here, as the vibration input detector, for example, an acceleration sensor may be used that detects acceleration of an unsprung part of the vehicle (a part that is movable with respect to a vehicle body in accordance with a stroke of a suspension device), a torque sensor that detects torque acting on a steering shaft in a power steering device, and any other sensor.

Here, the vibration application controller may be configured to extract a specific frequency band (typically, a band including 100 Hz to 400 Hz) of the vibration input from the road surface and to increase the amplitude of the vibration application waveform in accordance with the increase in the amplitude in the extracted band.

The invention claimed is:

1. A clutch operation device characterized by comprising:

a clutch operator configured to switch between an engaged state and a disengaged state, the engaged state involving power transmission performed between a traveling power source of a vehicle and wheels of the vehicle, the disengaged state involving the power transmission being cut off;

a vibration applicator configured to apply vibration to the clutch operator;

a transition state detector configured to perform detection of a transition state between the engaged state and the disengaged state; and a vibration application controller configured to activate the vibration applicator in accordance with the detection of the transition state, wherein the clutch operation device further comprises an operation speed detector configured to perform detection of an operation speed of the clutch operator, and the vibration application controller is configured to increase amplitude of a vibration application waveform of the vibration applicator in accordance with an increase in the operation speed.

2. The clutch operation device according to claim 1, wherein the vibration applicator is configured to apply the vibration to the clutch operator with a vibration application waveform comprising a frequency component in a range from 100 Hz to 400 Hz.

3. The clutch operation device according to claim 2, wherein the vibration applicator is configured to apply the vibration to the clutch operator with the vibration application waveform comprising a dominant frequency in the range from 100 Hz to 400 Hz.

4. The clutch operation device according to claim 1, wherein the clutch operator comprises a clutch pedal including a depressing surface member and a bracket supporting the depressing surface member, the vibration applicator is attached to the bracket of the clutch pedal.

5. A clutch operation device characterized by comprising:

a clutch operator configured to switch between an engaged state and a disengaged state, the engaged state involving power transmission performed between a traveling power source of a vehicle and wheels of the vehicle, the disengaged state involving the power transmission being cut off;

a vibration applicator configured to apply vibration to the clutch operator;

a transition state detector configured to perform detection of a transition state between the engaged state and the disengaged state; and a vibration application controller configured to activate the vibration applicator in accordance with the detection of the transition state, wherein the clutch operation device comprises a vibration input detector configured to perform detection of a vibration input from a road surface, and the vibration application controller is configured to increase amplitude of a vibration application waveform of the vibration applicator in accordance with an increase in amplitude of the vibration input.

6. The clutch operation device according to claim 5, wherein the vibration applicator is configured to apply the vibration to the clutch operator with a vibration application waveform comprising a frequency component in a range from 100 Hz to 400 Hz.

7. The clutch operation device according to claim 6, wherein the vibration applicator is configured to apply the vibration to the clutch operator with the vibration application waveform comprising a dominant frequency in the range from 100 Hz to 400 Hz.

8. The clutch operation device according to claim 5, wherein the clutch operator comprises a clutch pedal including a depressing surface member and a bracket supporting the depressing surface member, the vibration applicator is attached to the bracket of the clutch pedal.

* * * * *